United States Patent
Schwab et al.

(10) Patent No.: US 9,019,094 B2
(45) Date of Patent: Apr. 28, 2015

(54) METHOD FOR CHECKING TIRE PRESSURE IN REAL TIME

(71) Applicant: Bayerische Motoren Werke Aktiengesellschaft, Munich (DE)

(72) Inventors: Axel Schwab, Munich (DE); Jochen Hartmann, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/078,064

(22) Filed: Nov. 12, 2013

(65) Prior Publication Data
US 2014/0070936 A1 Mar. 13, 2014

Related U.S. Application Data

(63) Continuation of application No. PCT/EP2012/057486, filed on Apr. 24, 2012.

(30) Foreign Application Priority Data

May 13, 2011 (DE) .......................... 10 2011 075 830

(51) Int. Cl.
*B60C 23/02* (2006.01)
*B60C 23/04* (2006.01)

(52) U.S. Cl.
CPC .............. *B60C 23/04* (2013.01); *B60C 23/0457* (2013.01); *B60C 23/0459* (2013.01); *B60C 23/0462* (2013.01); *B60C 23/0481* (2013.01)

(58) Field of Classification Search
CPC ........... B60C 23/0416; B60C 23/0415; H01Q 1/3291

USPC .................................... 340/445, 447; 73/146
See application file for complete search history.

(56) References Cited

U.S. PATENT DOCUMENTS 6,271,748 B1  8/2001  Derbyshire et al.
7,119,670 B2  10/2006  Hammerschmidt
(Continued)

FOREIGN PATENT DOCUMENTS

DE          102 13 266 A1   10/2003
DE    10 2004 026 035 A1   12/2005
(Continued)

OTHER PUBLICATIONS

German Search Report dated Dec. 22, 2011 w/ English translation (ten (10) pages).
International Search Report dated Jun. 12, 2012 w/ English translation (five (5) pages).

*Primary Examiner* — Tai T Nguyen
(74) *Attorney, Agent, or Firm* — Crowell & Moring LLP

(57) ABSTRACT

A method is provided for real-time monitoring of tire pressure, wherein the pressure value determined by use of a pressure sensor in the tire is transmitted by an electronic wheel device, without the use of a trigger transmitter fixed on the vehicle, by radio, in short transmission intervals, to a monitoring device installed in the vehicle, only if, at least when the vehicle is not moving, the value is outside a prespecified normal range. When the vehicle is not moving, the electronic wheel device transmits a signal suitable for a system monitoring function, at certain time intervals and, using the same time frame or a whole-number fraction or multiple thereof, carries out a measurement of the tire pressure. The signal has a short transmission duration on the order of 25 μs to 500 μs.

15 Claims, 1 Drawing Sheet

(56) References Cited

U.S. PATENT DOCUMENTS

| | | | |
|---|---|---|---|
| 7,532,957 B2 | 5/2009 | Kuchler | |
| 2003/0179085 A1* | 9/2003 | Ghabra et al. | 340/445 |
| 2004/0134270 A1* | 7/2004 | Hirohama | 73/146 |
| 2006/0001534 A1* | 1/2006 | Shida et al. | 340/445 |
| 2010/0308987 A1 | 12/2010 | Haas et al. | |

FOREIGN PATENT DOCUMENTS

| | | |
|---|---|---|
| DE | 10 2007 040 340 A1 | 3/2009 |
| JP | 2006-151003 A | 6/2006 |
| WO | WO 94/06640 A1 | 3/1994 |

* cited by examiner

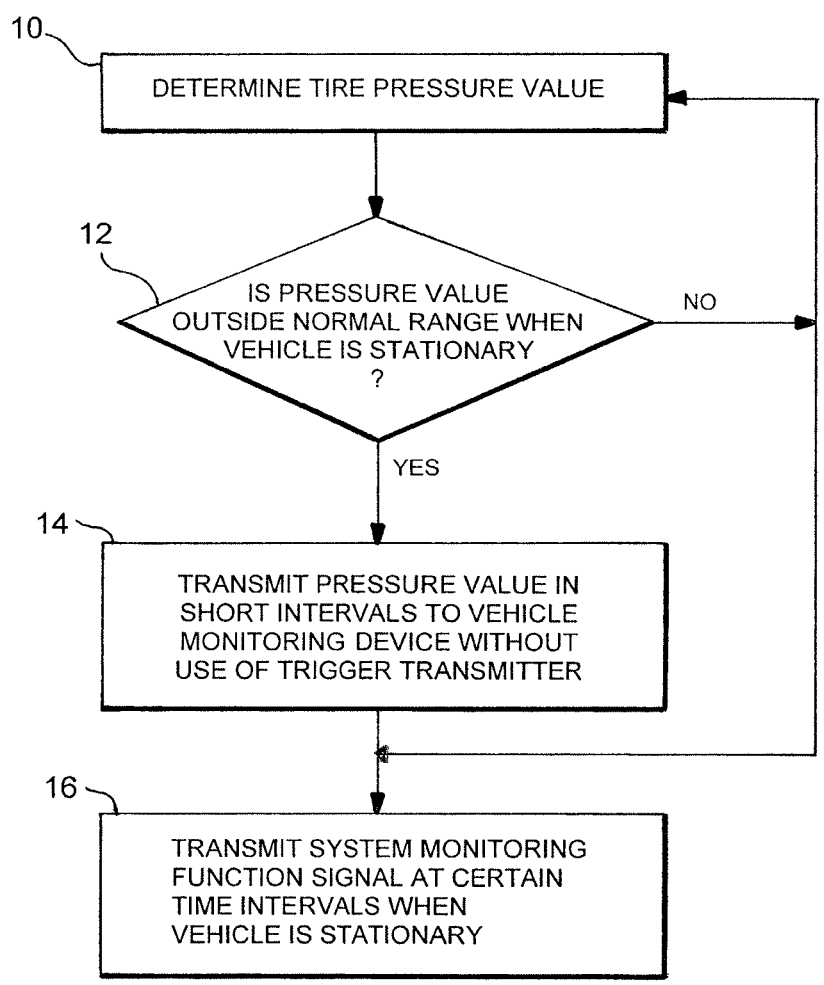

US 9,019,094 B2

METHOD FOR CHECKING TIRE PRESSURE IN REAL TIME

CROSS REFERENCE TO RELATED APPLICATIONS

This application is a continuation of PCT International Application No. PCT/EP2012/057486, filed Apr. 24, 2012, which claims priority under 35 U.S.C. §119 from German Patent Application No. DE 10 2011 075 830.5, filed May 13, 2011, the entire disclosures of which are expressly incorporated by reference herein.

BACKGROUND AND SUMMARY OF THE INVENTION

The invention relates to a method for the real-time monitoring of tire pressure on a motor vehicle, wherein the pressure reading determined by use of a pressure sensor arranged in the tire is transmitted in brief transmission intervals by an electronic wheel device, via radio and without using a trigger transmitter fixed in the vehicle, to a monitoring device installed in the vehicle, at least when the vehicle is not moved, and only when the pressure reading is outside of a prespecified normal range. By way of example, the prior art includes DE 102 13 266 A1.

Today, systems for monitoring the air pressure in vehicle tires are already used in passenger vehicles. These systems measure the pressure in the tire and telemetrically transmit, meaning via radio, the measured values to a monitoring device installed in the vehicle. The electronic wheel device currently used for this purpose is designed to transmit a so-called telegram when the vehicle is moving at a speed above a threshold value of, by way of example, 15 km/h, wherein this speed can be determined by an acceleration sensor integrated into the electronic wheel device, in short intervals of time. The telegram typically contains information about the transmitter, particularly the so-called identification number, and also the current value for the pressure and the temperature of the air in the tire. Typically, a transmission time on the order of 5 milliseconds to 20 milliseconds is required. The electrical batteries integrated into the electronic wheel devices in this case are designed to provide the electrical power needed for this function over a period of approximately 10 years.

Before the electronic wheel devices described in the previous paragraph came into use, such electronic wheel devices installed in the tire only transmitted the measured pressure value to a monitoring device installed in a fixed position in the vehicle after receiving a trigger signal, which trigger signal was sent by a transmission device installed on the vehicle near to the respective tire.

In several different countries, there is a requirement by law that the air pressure in the tire is monitored immediately upon start-up of the vehicle, and if an unacceptable tire pressure is detected, the driver is to be notified of this, wherein it is not necessary to make the vehicle move for this purpose. Because, therefore, a pressure monitoring must be carried out when the vehicle is stationary, it is not possible to use the system as briefly described above, which is currently in use. This system could be modified in such a manner that the measured tire pressure is transmitted to the monitoring device continuously, meaning even when the vehicle is stationary, and particularly even when the vehicle has not even been started—but then it is not possible to even come close to achieving the required life span of the batteries which power the electronic wheel device, said life span being approx. 10 years. In addition (more theoretically), the earlier system mentioned above having the trigger transmitter could be used, wherein the electronic wheel device can be implicitly informed of the vehicle being started by corresponding trigger signals being transmitted only when the vehicle has been started, wherein the electronic wheel device would consequently thereby need to be used much less frequently (and therefore would require significantly less electrical energy). However, this would involve relatively high cost and effort.

Also known from DE 102 13 266 A1 is the approach of transmitting at least a part of the detected tire pressure measured value with a modifiable frequency to a receiving device, which in the present case is a monitoring device, wherein the frequency of the transmission of the tire pressure measured value is derived from the detected tire pressure measured value itself. In this case, it is possible to not transmit all of the measured values detected by the transmission device installed in the tire and/or wheel of the vehicle, as long as the detected tire pressure measured value is in a normal range. In this way, it is possible to significantly reduce the energy consumption of the transmission device; however, it has been shown that it is not yet possible, with a reasonable design of this system, which ensures the desired battery life span, to obtain a valid declaration, substantially immediately upon start-up of the vehicle, about the functional security of the tire pressure monitoring system, and particularly about the accuracy of the tire pressure and/or optionally a defectiveness thereof, after a longer period during which the vehicle has been stationary.

Therefore the problem addressed by the invention is that of providing a method which is suitable, while using the conventional electric batteries, to monitor the tire pressure in real-time over the required operating life of approx. 10 years, by way of example, without a trigger transmitter which is fixed on the vehicle being necessary. The term "real-time monitoring" in this case, in the context of a tire pressure monitoring system, means a tire pressure monitoring system which is capable of real-time monitoring which will be required in the future by law in several countries, and by means of which warnings relating to a tire overpressure, a tire low pressure or a system failure are displayed to the driver or the user of the vehicle within a few seconds. In this case, it is also required that the driver is immediately informed within a few seconds upon start-up of the vehicle, while the same is still stationary, by means of a very quick announcement, of a system failure or of inadequate tire pressure in a tire.

The solution to this problem consists of a method for the real-time monitoring of the tire pressure in, particularly, a motor vehicle, wherein the pressure value determined by use of a pressure sensor included in the tire is transmitted by an electronic wheel device, without the use of a trigger transmitter fixed on the vehicle, by radio, in short transmission intervals, to a monitoring device installed in the vehicle, only if—at least when the vehicle is not moving—the value is outside a prespecified normal range. In contrast, when the vehicle is not moving, the electronic wheel device transmits a signal which is at least suited for the system monitoring function, at certain intervals, said signal having a short transmission duration on the order of 25 μs to 500 μs, and using the same time frame, or a whole-number fraction or multiple thereof, and carries out a measurement of the tire pressure. Advantageous implementations are described and claimed herein. In addition, features of a device for carrying out the method according to the invention are described and claimed herein.

In order to make it possible to enable the required real-time monitoring in a simple manner and over many years, without an exchange of the electrical batteries integrated into the electronic wheel device, the composite functions, as fundamentally required in a tire pressure monitoring system and in systems which are conventional at this time, of a system and transmission path monitoring, on the one hand, as well as the monitoring of the tire pressure on the other hand, are divided in such a manner that each of these two functions are optimized while fulfilling the named real-time requirements with respect to the energy consumption thereof. In this regard, at least one signal which serves the purpose of monitoring the system and the transmission path is effectively continuously—meaning repeatedly in short time intervals—transmitted to the monitoring device installed in the vehicle, while a signal which transmits the tire pressure is only transmitted, when the vehicle is stationary, if the tire pressure is outside of its prespecified normal range in any way. Of course, the pressure in the tire is likewise measured in this effectively continuous manner, but the measured values are only transmitted, at least when the vehicle is not in motion, if these values are abnormal. A first check of whether the measured pressure values are in the normal range or outside of the same is therefore carried out according to the invention in the electronic wheel device itself, at least when the vehicle is not in motion.

The advantage of this division of functions is that the short transmission of a system monitoring signal requires significantly less electrical energy than the energy-consuming transmission of a measured pressure value, and typically also of a signal which represents, is indicative of, or transmits a measured temperature value. Because the time-frame in which a vehicle is not moving is typically significantly larger than the time-frame in which the vehicle is moving, it is possible with the method according to the invention to already significantly reduce the consumption of electrical energy in the electronic wheel device if the method is only carried out when the vehicle is stationary. The energy consumption of the electronic wheel devices can, of course, be further reduced if the method here is carried out fundamentally—meaning when the vehicle is in motion as well. In this case, signals are also transmitted, when the vehicle is in motion, by the electronic wheel device, in principle in short transmission intervals, said signals serving the purpose of system monitoring, while the measured tire pressure values (and the temperature values of the air in the tire, which will be addressed in greater detail at a later point) are only transmitted if the pressure values are outside of a prespecified normal range. Whether the vehicle is stationary or is in motion can be determined in this case preferably as has been done conventionally up to this point—by use of an acceleration sensor integrated into the electronic wheel device. However, as an alternative, this can be performed by use of other sensors suitable for the same—for example based on the deformation of the tire in the so-called tread area.

The present invention therefore exploits the knowledge, as discussed above, that the majority of the electrical energy required by an electronic wheel device of a tire pressure monitoring system is consumed by the radio transmitter of this device, while the actual measurements of pressure, and typically also the temperature of the air in the tire, only consume a fraction of the energy required for the transmission. In addition to this known fact, in the present case there is a difference regarding the information which is transmitted by radio. According to the invention, a relatively long, and therefore energy-wasting information transmission is restricted to few situations, at least when the vehicle is not in motion, and only takes place if an abnormality is detected. In contrast, an extremely short information transmission for the purpose of monitoring the system function requires very little energy, and can and/or should therefore occur regularly and frequently even when the vehicle is not in motion. A signal in this respect particularly only requires an extremely short transmission duration, on the order of 25 microseconds to 500 microseconds, according to how high the requirement is set with respect to susceptibility to failure.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a flow-chart illustrating an exemplary method for real-time monitoring of tire pressure in a tire of a wheel of a vehicle according to an embodiment of the invention.

DETAILED DESCRIPTION OF THE DRAWING

FIG. 1 is a simplified flowchart illustrating an exemplary method for the real-time monitoring of tire pressure in a tire of a wheel of a vehicle. At an initial step, the method determines, via a pressure sensor configured in the vehicle, a tire pressure value (10). A query is then made as to whether the pressure value is outside of a prespecified normal range at least when the vehicle is not moving (12). If the pressure value is outside of the prespecified normal range when the vehicle is not moving, then the pressure value is transmitted, via an electronic wheel device and without use of a trigger transmitter fixed on the vehicle, to a monitoring device installed in the vehicle by way of a radio signal in short transmission intervals (14). Also when the vehicle is not moving, the electronic wheel device transmits a signal at certain time intervals, which signal is suitable for a system monitoring function and has a short transmission duration on an order of 25 µs to 500 µs (16). The electronic wheel device carries out a measurement of the tire pressure using a same timeframe or a whole-number fraction or multiple thereof of the certain time intervals. The certain time intervals may be on an order of from 4 to 10 seconds, and may be dependent upon an elapsed time since the vehicle was previously moved. Of course, the certain time intervals may be constantly varied.

It is stated that the pressure value determined in the tire by use of a pressure sensor is only transmitted to the monitoring device fixed on the vehicle, at least when the vehicle is not in motion, if said pressure value is outside of a prespecified normal range. Of course, optionally determined values for the temperature of the air in the tire can be transmitted together with the transmitted pressure values. However, when the vehicle is not in motion, the transmission of the temperature value is not necessary, in any case, if the vehicle has been stationary for a longer period of time. If, however, the temperature of the air in the tire has increased as the result of a longer and/or faster operation of the vehicle, which operations are known to result in a pressure increase in the tire, the air temperature in the tire should also be taken into account, because only with this value is it possible to make a valid declaration regarding whether a pressure in the tire is unacceptably high. However, this corresponding estimate can be carried out in the monitoring device fixed on the vehicle, as already performed up to this point using the method according to the invention. What is essential is particularly only that, when the vehicle is started up, at which point the air in the tires is typically not significantly warmer than the surrounding temperature due to the previous stationary period of the vehicle, a check is made in a first step of whether the pressure in the tire is unacceptably low. The term "outside of a prespecified normal range" used herein should be understood in this sense. That is, in this regard, it is only strictly necessary to check whether the pressure measured in the tire is below a prespecified threshold, and preferably in addition, whether a drop in pressure over time has occurred which is larger than a prespecified threshold for a pressure change.

It is hereby repeated once more that the measurement of the tire pressure when the vehicle is stationary is carried out in short intervals in an effectively continuous manner, while a transmission of a determined pressure value to the monitoring device fixed on the vehicle only takes place, at least when the vehicle is stationary, if the determined pressure value is below a prespecified threshold, and therefore outside of a prespecified normal range. The monitoring device fixed on the vehicle can likewise receive the corresponding information in an effectively continuous manner, or the monitoring device fixed on the vehicle can be started up only once the vehicle is started up, after which it then receives the next transmission telegram of the electronic wheel device, but then can always provide notice of a possible loss of pressure in the tire in a timely manner.

However, in the electronic wheel device, not only can a check be made as to whether the measured air pressure in the tire is below the prespecified threshold, and therefore outside of a prespecified normal range, and/or whether a drop in pressure can be determined over time which is greater than a prespecified threshold (in the sense of a normal range), but also at the same time, a check can be made as to whether there is an unacceptably high pressure in the tire. In this case, in this so-called first monitoring step carried out in the electronic wheel device, in which a decision is made, at least when the vehicle is not in motion, as to whether a pressure value is even transmitted to the monitoring device fixed on the vehicle, for reasons of simplicity, influences of temperature are left out of consideration. However, such influences must not be left out of consideration.

The previous paragraph discusses that, at least when the vehicle is not in motion, only pressure values which are below a threshold for the partially loaded cold-fill pressure of the tire, or above a threshold for the fully-loaded cold-fill pressure of the tire, or which are above a threshold for a drop in pressure in the tire determined over a certain period of time, are transmitted by radio by the electronic wheel device. The fully-loaded cold-fill pressure of the tire in this case is the air pressure in the tire at an air temperature corresponding to the surrounding temperature, if the tire is filled to its maximum pressure, and the partially-loaded cold-fill pressure is a tire fill pressure which is reduced as usual for reasons of comfort by a suitable degree. The defined threshold for the partially-loaded cold-fill pressure in this case can be 75% of the partially-loaded cold-fill pressure, by way of example, and the threshold for the fully-loaded cold-fill pressure can be 125% of the fully-loaded cold-fill pressure, by way of example. An exemplary threshold for a rapid drop in pressure in the tire, for which likewise a check should preferably be carried out in the electronic wheel device, can be a value of 0.3 bar/minute.

From calculations, it is found that the time intervals with which or in which the electronic wheel device transmits short telegrams, even when the vehicle is stationary (and therefore even when the vehicle is turned off and not in operation), said telegrams having a transmission duration on the order of 25 μs to 500 μs and containing a signal which serves the purpose of system monitoring, can be on the order of 4 seconds to 10 seconds, in order to substantially meet the requirements discussed above. In this case, the electronic wheel device can either transmit in a fixed time-frame in this or another time range, or the electronic wheel device can transmit in a variable time-frame, wherein the time-frame between two transmissions is in a range from 4.4 s to 5.6 s, by way of example. In this case, the time interval between the two transmissions can be continuously varied, in an advantageous manner according to the identification number (ID number) of the electronic wheel device, or to an extract of this ID number, whereby the electronic wheel device effectively transmits the ID number and/or a part thereof to the monitoring device fixed on the vehicle via multiple transmissions. Because this monitoring device knows the ID numbers of the electronic wheel devices installed on the vehicle, it is possible to reliably differentiate the on-board electronic wheel devices from those of other vehicles using the time intervals between the individual signals. As an alternative, the electronic wheel device can transmit in a variable time-frame, wherein the time difference between the current and the following transmission time point is determined via a random number generator, and preferably is transmitted in coded form in the current telegram.

In any case, when the vehicle is turned off (this corresponds to "ignition off"), the monitoring device fixed on the vehicle can advantageously be activated only in such time periods, for the purpose of saving electricity, when radio signals from the associated wheels and/or electronic wheel devices of the vehicle are expected. In this way, it is possible to prevent the vehicle battery from being completely drained when the vehicle is stationary for a longer time. However, it is hereby expressly stated once more that the monitoring device need not in any way receive signals from the electronic wheel device when the vehicle is turned off in order to carry out the method according to the invention; rather, it can be sufficient if the monitoring device is only made operable once the vehicle is started up. In this case as well, the monitoring device receives signals from the electronic wheel devices immediately after start-up, and can thereby detect that these are at least functional. If no pressure value is transmitted with these signals from the electronic wheel devices, it is then possible to make the assumption that the fill pressure of all tires of the vehicle is in the prespecified normal range, such that there is no state which is critical to safety. If, however, the monitoring device fixed on the vehicle is active at least in intervals, when the vehicle is turned off—meaning is not in operation—and therefore signals can be received from the electronic wheel devices, then in this way it is possible not only to immediately inform the vehicle driver, upon start-up of the vehicle, with even greater reliability, whether the pressure value in each tire is within the prespecified normal range or is outside of the same, but also it is possible to provide a damage warning or theft warning for the tires when the vehicle is turned off. By way of example, when the vehicle is stationary and not in operation—that is, when the ignition is off and the vehicle is parked—in the event of a drop in pressure transmitted to the monitoring device, which indicates a tire puncture, the alarm system can be activated, or a corresponding alarm can be placed via the mobile radio network. A removal of the tire can be detected by way of a field-strength monitoring of the signals transmitted by the electronic wheel devices, and likewise the alarm system can then be triggered.

At this point, greater detail will be given regarding the determination and checking of the tire pressure in the electronic wheel device. First, for this purpose, the prespecified normal range is programmed into this electronic wheel device, meaning at least one threshold for the minimum pressure which must be available in the tire, in a suitable manner (this is described in greater detail at a later point), preferably however a range defined by a minimum value and a maximum value, for example in the form of the threshold values named above for the partially-loaded and fully-loaded cold-fill pressure of the tire. At least when the vehicle is stationary, and optionally also when the vehicle is in motion, the pressure in the tire is measured at short time intervals, in the range from 1 to 5 seconds. These measurement intervals are ideally coupled to the transmission intervals of the electronic wheel device in such a manner that the time-frame for the pressure measurement is oriented to the time intervals of the transmission of signals which are at least suitable for the monitoring of the system. The pressure measurements can therefore take place at a whole-number multiple or at a whole-number fraction of the named time interval in which the electronic wheel device transmits short telegrams. Preferably, a pressure measurement is carried out twice as often as a telegram is transmitted. As such, if a telegram is transmitted every 2 seconds, then a pressure measurement is carried out each second. If the specific time intervals as described above change based on the ID number, then the pressure measurement rate changes accordingly. The pressure measurement rate then varies, by way of example, in a time range from 2.2-2.8 seconds. As long as the determined pressure values are inside the pre-specified normal range, the electronic wheel device then transmits only the named signals, which are also suitable for the monitoring of the system, as described in greater detail at a later point, in a regular manner and in the named short time intervals (the transmission intervals), while complete transmission telegrams which additionally contain the ID number of the electronic wheel device as well as the most recently measured pressure value and temperature value are only transmitted in very long transmission intervals, which typically are longer than 5 minutes. Only if the electronic wheel device detects particularly a low pressure or a fast drop in pressure—and optionally also an overpressure—based on the measured pressure value, such that the determined pressure value therefore lies outside of the prespecified normal range, does the electronic wheel device also transmit the pressure value, together with the ID number and preferably a complete telegram which also includes the temperature value, in the named short time intervals.

Following these explanations of the pressure measurement and the monitoring, greater detail is also given here on the system and transmission link monitoring signal transmitted in an effectively continuous manner by the electronic wheel device, and therefore also when the vehicle is stationary. For this, according to the requirements pertaining to susceptibility to failure, the following embodiments are possible, by way of example. For example, each transmission can consist of a short carrier signal with a transmission duration in the range from approximately 25 µs to 100 µs, for the purpose of saving electricity. As an alternative, the electronic wheel devices can transmit, preferably in an amplitude shift keying mode (ASK mode), which requires less energy, a short bit pattern which clearly characterizes the position of the electronic wheel device on the vehicle, wherein the transmission duration of said bit pattern can be approximately 100 µs to 500 µs. Possible examples of such a transmission pattern are, for the front left electronic wheel device, 11010101, for the front right, 10110101, for the rear left, 10101101, and for the rear right, 10101011. Such a pattern offers the advantage that the four wheel positions of the vehicle can be reliably differentiated in ASK mode, and that for each wheel position the transmission duration is the same length as a logical "1," meaning that no difference in battery life span is expected for each of the four wheel positions. In this case, each of the wheel positions can either be programmed into the electronic wheel devices during the installation thereof, or such fundamentally known electronic wheel devices can be used which independently determine their position. As an alternative, each transmitted signal can be derived from the ID number (as mentioned above) and/or a shortened ID number of the electronic wheel device, wherein for this purpose as well, an energy-saving transmission is preferably made in an ASK mode.

According to one embodiment, the time intervals, as already thoroughly explained above, in which the electronic wheel device transmits signals, in short transmission intervals, which are suitable at least for a monitoring of the system, can be dependent on the time period which has passed since the previous movement of the vehicle. As such, and particularly for the purpose of saving electricity, the system can switch into a second transmission mode after a longer period in which the vehicle is stationary, for example after 24 hours during which the vehicle has not been started up, wherein in the second transmission mode, the distance between two transmissions is enlarged by a preferably whole-number factor, by way of example on the order of 10. Particularly in the case of such long time intervals, however, the tolerances of the idle RC oscillators, which are used in the transmitter and in the receiver in standby mode, can lead to a problem. In order to solve this problem of the different time tolerances within the pulsing between the transmitter positioned in the electronic wheel device and the receiver in the monitoring device fixed on the vehicle, an estimation can be implemented in the receiver, which inserts a correction factor—with respect to tolerance—for each individual electronic wheel device, and the receiver and the monitoring device itself. In general, the assumption can be made that the pulsing does not change briefly, and rather only drifts slowly and particularly according to temperature. A possible profile of such an estimation is described below.

After the vehicle is turned off and/or ceases operation, the electronic wheel devices are fully active for a certain period of time, for example 5 minutes, which can also be dependent on the cooling of the tires, meaning on the change in the air temperature inside the tire. This means that complete telegrams including pressure values and temperature values are still transmitted in FSK mode (frequency shift keying mode) during this time period, and these can also be received by the monitoring device fixed on the vehicle. After this, the electronic wheel device should switch to ASK mode with a determined time behavior which is known to the monitoring device, meaning to the receiver, and only send the described, short (transmission link) monitoring signals. The monitoring device in this case should also be completely active for a certain time period, and should determine an individual correction factor during this time period for each electronic wheel device, for the purpose of nominal transmission timing. In the event that the transmission timing continues to drift, the temperatures measured by the electronic wheel devices (and/or the temperature history) and the outside temperature as available to the vehicle, and/or the chip temperature of the micro-controller, should be utilized for the estimation and/or for an expected drift. As soon as the required values are determined, the receiver itself goes into standby mode for a certain time, wherein this time must be shorter, by the maximum tolerance, than the next expected signal transmitted by an electronic wheel device. Next, the receiver itself determines its time correction factor using the signal which then arrives, taking into account the individual correction factor of said signal. The receiver can thereby optimize its correction step by step, and in this way further reduce the necessary switch-on time, which minimizes the energy consumption of the receiver—meaning the monitoring device fixed on the vehicle.

Coming back once more to the transmission of pressure values, at least the first pressure value which is transmitted after a determined deviation of the measured tire pressure from the normal range, or a few pressure values following after this pressure value, or only one bit sequence which characterizes such a deviation, is or are transmitted, in an amplitude shift keying mode, wherein less energy is needed therefor than if the corresponding value would be transmitted as usual in a frequency shift keying mode (FSK mode). By way of example, a special bit sequence which signals an unacceptable pressure deviation at a certain wheel of the vehicle can be as follows: 11010111. Next, the complete telegram which has been normal up to this point can be transmitted in FSK mode.

Likewise for the purpose of saving electricity, the pressure measurements can be carried out, at least when the vehicle is stationary, first in a so-called "saving mode," wherein the measurement precision is lower than in the normal operating mode by a factor of 2 to 3, for example. Less current is required for this measurement with reduced precision, and it is still nevertheless possible to reliably detect when, or as soon as, the prespecified warning threshold, meaning a boundary of said normal range, is being approached. As soon as this warning threshold is being approached, the measurement precision is preferably switched to the normal operating mode.

One advantageous device for the purpose of carrying out the method according to the invention can contain a physical logic circuit instead of a substantially freely programmable micro-controller. Such a logic circuit—also called a state machine—is characterized by reduced energy consumption, and can reliably and easily execute, when given a suitable design, the necessary action, such as the generation of a transmission bit sequence, the transmission timing, meaning the determination of the time intervals, and the corresponding transmission of the corresponding signals and/or the continuous pressure monitoring and the recognition of a deviation from the prespecified normal range.

In addition, one advantageous device for the purpose of carrying out the method according to the invention can contain at least one suitable measure for preventing an undesired manipulation of the thresholds stored in the electronic wheel device. As such, the electronic wheel devices can only be written with corresponding pressure values which represent the normal range one time within a period of, by way of example, 24 hours after their first activation via the LF interface thereof. As an alternative, the electronic wheel devices can only be written while they rotate at a certain speed which corresponds to the speed used during the balancing of the tire and/or of the vehicle wheel configured with the tire, such that in this way the programming of the pressure value can only be carried out during the balancing. As an alternative, the electronic wheel devices can be made to only be written with the pressure values via electrical contacts on their housing. As an alternative, the electronic wheel devices can be written with pressure values only via their LF interfaces, while they are in a certain device which applies a precisely defined pressure to the electronic wheel devices, for example in the range from 4.0-6.5 bar. As an alternative, the electronic wheel devices can be independently programmed after their activation via the filled pressure value. In addition to the measures described above by way of example, a certain minimum LF field strength can be required.

One particular advantage of the method according to the invention is that it is possible to continue to use the monitoring devices which are currently installed for this purpose on the vehicle, such that for countries which require real-time tire pressure monitoring systems, only one special electronic wheel device needs to be installed in which this method is implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for real-time monitoring of tire pressure in a tire of a wheel of a vehicle, the method comprising the acts of:
   determining, via a pressure sensor configured in the tire, a pressure value;
   transmitting, by an electronic wheel device and without use of a trigger transmitter fixed on the vehicle, the pressure value via radio in short transmission intervals to a monitoring device installed in the vehicle only if the pressure value is outside of a prespecified normal range at least when the vehicle is not moving;
   transmitting, by the electronic wheel device and when the vehicle is not moving, a signal at certain time intervals, said signal being suitable for a system monitoring function and having a short transmission duration on an order of 25 µs to 500 µs, wherein
   the electronic wheel device carries out a measurement of the tire pressure using a same time frame or a whole-number fraction or multiple thereof, of the certain time intervals.

2. The method according to claim 1, wherein the certain time intervals are on an order of 4 to 10 seconds.

3. The method according to claim 2, further comprising the act of:
   only activating the monitoring device installed in the vehicle during time periods in which transmissions by the electronic wheel device are expected.

4. The method according to claim 1, wherein the certain time intervals are dependent on an elapsed time since prior movement of the vehicle.

5. The method according to claim 1, wherein the certain time intervals are constantly varied.

6. The method according to claim 1, further comprising the act of:
   only activating the monitoring device installed in the vehicle during time periods in which transmissions by the electronic wheel device are expected.

7. The method according to claim 1, wherein the certain time intervals in which the signal suitable for the system monitoring function is transmitted are varied according to an identification number of the electronic wheel device transmitting the signal.

8. The method according to claim 1, wherein the certain time intervals in which the signal suitable for the system monitoring function is transmitted are varied according to a random value transmitted by the electronic wheel device in a prior transmission.

9. The method according to claim 1, wherein the signal suitable for the system monitoring function comprises a telegram transmitted in an amplitude shift keying mode and contains a bit pattern characterizing a position of the wheel.

10. The method according to claim 1, wherein the certain time intervals after a longer period in which the vehicle is stationary are a whole-number multiple of the certain time intervals during movement or a shorter stationary phase of the vehicle; and wherein an estimation method is applied for the longer period in order to compensate different time tolerances of the electronic wheel device and the monitoring device.

11. The method according to claim 1, wherein the carrying out of the measurement of the tire pressure is performed with a reduced precision when the vehicle is stationary, said reduced precision pressure measurement requiring less electrical energy than for a more precise pressure measurement.

12. The method according to claim 1, wherein the electronic wheel device only transmits by radio pressure values which are:
   (i) below a threshold for a partially-loaded cold-fill pressure of the tire,
   (ii) above a threshold for a fully-loaded cold-fill pressure of the tire, or
   (iii) above a threshold for a drop in pressure in the tire determined over a defined time period.

13. The method according to claim 1, wherein the electronic wheel device transmits in an amplitude shifting keying mode one of:
   at least a first pressure value transmitted after a deviation of the measured tired pressure from the normal range is determined,
   a few pressure values following the first pressure value, or
   only one bit sequence characterizing the deviation.

14. A device for real-time monitoring of tire pressure in a tire of a wheel of a vehicle, the device comprising:
   a physical logic circuit operatively configured to:
      determine, via a pressure sensor configured in the tire, a pressure value;
      transmit, by an electronic wheel device and without use of a trigger transmitter fixed on the vehicle, the pressure value via radio in short transmission intervals to a monitoring device installed in the vehicle only if the pressure value is outside of a prespecified normal range at least when the vehicle is not moving;
      transmit, by the electronic wheel device and when the vehicle is not moving, a signal at certain time intervals, said signal being suitable for a system monitoring function and having a short transmission duration on an order of 25 μs to 500 μs, wherein
   the electronic wheel device carries out a measurement of the tire pressure using a same time frame or a whole-number fraction or multiple thereof, of the certain time intervals.

15. The device according to claim 14, further comprising:
   means for preventing manipulation of thresholds stored in the electronic wheel device.

* * * * *